US006622129B1

(12) United States Patent
Whitworth

(10) Patent No.: US 6,622,129 B1
(45) Date of Patent: Sep. 16, 2003

(54) METHOD OF CREATING AN INDEX OF RESIDUAL VALUES FOR LEASED ASSETS, TRANSFERRING RESIDUAL VALUE RISK, AND CREATING LEASE SECURITIZATIONS

(76) Inventor: Brian L. Whitworth, 3003 Sequit Dr., Malibu, CA (US) 90265

( * ) Notice: Subject to any disclaimer, the term of this patent is extended or adjusted under 35 U.S.C. 154(b) by 0 days.

(21) Appl. No.: 09/503,545

(22) Filed: Feb. 14, 2000

(51) Int. Cl.7 .............................................. G60F 17/60
(52) U.S. Cl. ...................................................... 705/37
(58) Field of Search ..................................... 705/30, 37

(56) References Cited

U.S. PATENT DOCUMENTS

| | | | |
|---|---|---|---|
| 5,946,667 A | 8/1999 | Tull, Jr. et al. | ................ 705/36 |
| 5,987,435 A | 11/1999 | Weiss et al. | ................... 705/36 |
| 6,009,402 A | 12/1999 | Whitworth | ...................... 705/4 |

FOREIGN PATENT DOCUMENTS

AU          200051961 A    *  8/2000

OTHER PUBLICATIONS

A. Reinebach, "Copelco Unveils Residual Value Securities", *Investment Dealers Digest*, Apr. 20, 1998, pp. 11–12.
A. Reinebach, "Toyota sells rare residual value securitization", *Investment Dealers Digest*, Aug. 10, 1998, p. 5.
S. Litwin, "Unlocking the Mysteries of Auto Lease Securitization", *Business Credit*, Sep. 1996, pp. 28–30.
J. Edgerton, "Lease Squeeze", *Money*, Jul. 1999, pp. 135–136.
Commodity Futures Trading Commission, "Economic Purposes of Commodity Futures Trading", Jan. 1997, http://www.cftc.gov/opa/brochures/econpurp.html.
Commodity Futures Trading Commission, "Futures and Options Contracts Designated by the Commodity Futures Trading Commission as of Sep. 30, 1998", Sep. 1998, http://www.cftc.gov/annualreport98/contractsdesig.htm.
Chicago Board of Trade, "Catastrophe Insurance Options, The Standardized Alternative for Managing Catastrophe Risk", http://www.cbot.com/ourproducts/financial/pcs_intr.html (downloaded Jan. 14, 2000).
Chicago Board of Trade, "Using Cat Option Protection", http://www.cbot.com/ourproducts/financial/pcs_intr.html (downloaded Jan. 14, 2000).
Chicago Board of Trade, "PCS Catastrophe Insurance Options: Frequently Asked Questions", http://www.cbot.com/ourproducts/financial/cat_faq.html (downloaded Jan. 14, 2000).
Chicago Mercantile Exchange, "Matching CME Quarterly Bankruptcy Index Futures to Different Trading Horizons: A Primer", http://www.cme.com/qbi/qbiprimer.html (downloaded Jan. 14, 2000).
Chicago Mercantile Exchange, "Weather Futures & Options", http://www.cme.com/weather/weather.html (downloaded Jan. 14, 2000).

* cited by examiner

*Primary Examiner*—Kenneth R. Rice
(74) *Attorney, Agent, or Firm*—Henricks, Slavin & Holmes LLP

(57) ABSTRACT

A method of creating an index of residual values for leased assets such as vehicles, transferring residual value risk, and creating lease securitizations. The index of residual values includes valuation information pertaining to different types of vehicles, different models and submodels of vehicles, different combinations of vehicle options, different vehicle model years, etc. The residual value index is updated with subsequent valuations of the leased assets and is employed to facilitate the transfer of residual value risk and create lease securitizations via mechanisms such as residual value futures, options, bonds and insurance products.

4 Claims, 8 Drawing Sheets

FIG. 5

| A | B | C | D | E | F | G | H | I | J | K |
|---|---|---|---|---|---|---|---|---|---|---|
| MDL YR | MANUF | MODEL | SUBMODEL | BASE MSRP | % MAN TRANS | $ MAN TRANS | %AUTO TRANS | $AUTO TRANS | %AIR COND | $AIR COND |
| 1998 | ACURA | INTEGRA | 3DR COUPE LS | 19,705 | 40.1% | 0 | 59.9% | 850 | 100.0% | 0 |
| 1998 | ACURA | INTEGRA | 3DR COUPE GS | 21,355 | 40.1% | 0 | 59.9% | 850 | 100.0% | 0 |
| 1998 | ACURA | INTEGRA | 4 DR SEDAN LS | 20,505 | 40.1% | 0 | 59.9% | 850 | 100.0% | 0 |
| 1998 | ACURA | INTEGRA | 4 DR SEDAN GS | 21,905 | 40.1% | 0 | 59.9% | 850 | 100.0% | 0 |
| 1998 | ACURA | INTEGRA | 3 DR COUPE GSR | 22,655 | 100.0% | 0 | 0.0% | 0 | 100.0% | 0 |
| 1998 | ACURA | INTEGRA | 4 DR SEDAN GSR | 22,955 | 100.0% | 0 | 0.0% | 0 | 100.0% | 0 |
| 1998 | ACURA | INTEGRA | 3DR TYPE R | 24,805 | 100.0% | 0 | 0.0% | 0 | 100.0% | 0 |
| 1998 | ACURA | TL | 4DR SEDAN | 28,855 | 0.0% | 0 | 100.0% | 0 | 100.0% | 0 |
| 1998 | ACURA | TL | 4DR SEDAN NAV | 30,855 | 0.0% | 0 | 100.0% | 0 | 100.0% | 0 |
| 1998 | ACURA | RL | 4DR SEDAN | 42,455 | 0.0% | 0 | 100.0% | 0 | 100.0% | 0 |
| 1998 | ACURA | RL | 4DR SEDAN NAV | 44,455 | 0.0% | 0 | 100.0% | 0 | 100.0% | 0 |
| 1998 | ACURA | NSX | 2DR COUPE | 84,745 | 100.0% | 0 | 0.0% | 0 | 100.0% | 0 |
| 1998 | ACURA | NSX | 2DR TARGA | 88,745 | 100.0% | 0 | 0.0% | 0 | 100.0% | 0 |
| 1998 | OTHER MANUFACTURER 1 | | | | | | | | | |
| 1998 | OTHER MANUFACTURER 2 | | | | | | | | | |
| 1998 | OTHER MANUFACTURER 3 | | | | | | | | | |
| ...... | | | | | | | | | | |
| 1998 | ALL | ALL | | | | | | | | |

FIG. 6

| A | B | C | D | L=E+F*G+H*I+J*K<br>AVG MSRP | M | N | O<br>% OF ALL UNITS | P<br>% OF ALL $ SALES |
|---|---|---|---|---|---|---|---|---|
| MDL YR | MANUF | MODEL | SUBMODEL | | # SOLD | $ SALES | | |
| 1998 | ACURA | INTEGRA | 3DR COUPE LS | 20,214 | 2,400 | 48,522,854 | 0.02% | 0.02% |
| 1998 | ACURA | INTEGRA | 3DR COUPE GS | 21,864 | 11,130 | 243,356,735 | 0.08% | 0.08% |
| 1998 | ACURA | INTEGRA | 4 DR SEDAN LS | 21,014 | 2,867 | 60,254,573 | 0.02% | 0.02% |
| 1998 | ACURA | INTEGRA | 4 DR SEDAN GS | 22,414 | 2,867 | 64,268,839 | 0.02% | 0.02% |
| 1998 | ACURA | INTEGRA | 3 DR COUPE GSR | 22,655 | 11,130 | 252,159,212 | 0.08% | 0.08% |
| 1998 | ACURA | INTEGRA | 4 DR SEDAN GSR | 22,955 | 2,867 | 65,819,637 | 0.02% | 0.02% |
| 1998 | ACURA | INTEGRA | 3DR TYPE R | 24,805 | 1,029 | 25,518,392 | 0.01% | 0.01% |
| 1998 | ACURA | TL | 4DR SEDAN | 28,855 | 7,860 | 226,813,573 | 0.05% | 0.07% |
| 1998 | ACURA | TL | 4DR SEDAN NAV | 30,855 | 15,259 | 470,802,252 | 0.10% | 0.15% |
| 1998 | ACURA | RL | 4DR SEDAN | 42,455 | 7,684 | 326,202,993 | 0.05% | 0.10% |
| 1998 | ACURA | RL | 4DR SEDAN NAV | 44,455 | 7,684 | 341,569,993 | 0.05% | 0.11% |
| 1998 | ACURA | NSX | 2DR COUPE | 84,745 | 5 | 422,030 | 0.00% | 0.00% |
| 1998 | ACURA | NSX | 2DR TARGA | 88,745 | 244 | 21,655,555 | 0.00% | 0.01% |
| 1998 | OTHER MANUFACTURER 1 | | | | | | | |
| 1998 | OTHER MANUFACTURER 2 | | | | | | | |
| 1998 | OTHER MANUFACTURER 3 | | | | | | | |
| ...... | | | | | | | | |
| 1998 | ALL | ALL | | 21,178 | 14,691,120 | 311,135,729,000 | 100.00% | 100.00% |

FIG. 7

| A | B | C | D | Q | R | S=R/L | T | U | V=U/L |
|---|---|---|---|---|---|---|---|---|---|
| MDL YR | MANUF | MODEL | SUBMODEL | RV DATE 1 | RV @ DATE 1 | %AVG MSRP 1 | RV DATE 2 | RV @ DATE 2 | %AVG MSRP 2 |
| 1998 | ACURA | INTEGRA | 3DR COUPE LS | 4/1/99 | 14,824 | 73.33% | 4/1/00 | 12,600 | 62.33% |
| 1998 | ACURA | INTEGRA | 3DR COUPE GS | 4/1/99 | 16,147 | 73.85% | 4/1/00 | 13,725 | 62.77% |
| 1998 | ACURA | INTEGRA | 4 DR SEDAN LS | 4/1/99 | 15,176 | 72.22% | 4/1/00 | 12,900 | 61.39% |
| 1998 | ACURA | INTEGRA | 4 DR SEDAN GS | 4/1/99 | 16,206 | 72.30% | 4/1/00 | 13,775 | 61.46% |
| 1998 | ACURA | INTEGRA | 3 DR COUPE GSR | 4/1/99 | 17,324 | 76.47% | 4/1/00 | 14,725 | 65.00% |
| 1998 | ACURA | INTEGRA | 4 DR SEDAN GSR | 4/1/99 | 17,676 | 77.00% | 4/1/00 | 15,025 | 65.45% |
| 1998 | ACURA | INTEGRA | 3DR TYPE R | 4/1/99 | 19,206 | 77.43% | 4/1/00 | 16,325 | 65.81% |
| 1998 | ACURA | TL | 4DR SEDAN | 4/1/99 | 23,353 | 80.93% | 4/1/00 | 19,850 | 68.79% |
| 1998 | ACURA | TL | 4DR SEDAN NAV | 4/1/99 | 23,765 | 77.02% | 4/1/00 | 20,200 | 65.47% |
| 1998 | ACURA | RL | 4DR SEDAN | 4/1/99 | 29,000 | 68.31% | 4/1/00 | 24,650 | 58.06% |
| 1998 | ACURA | RL | 4DR SEDAN NAV | 4/1/99 | 29,500 | 66.36% | 4/1/00 | 25,075 | 56.41% |
| 1998 | ACURA | NSX | 2DR COUPE | 4/1/99 | 60,794 | 71.74% | 4/1/00 | 51,675 | 60.98% |
| 1998 | ACURA | NSX | 2DR TARGA | 4/1/99 | 63,706 | 71.79% | 4/1/00 | 54,150 | 61.02% |
| OTHER MANUFACTURER 1 | | | | | | | | | |
| OTHER MANUFACTURER 2 | | | | | | | | | |
| OTHER MANUFACTURER 3 | | | | | | | | | |
| ...... | | | | | | | | | |
| 1998 | ALL | ALL | | 4/1/99 | 14,468 | 68.32% | 4/1/00 | 12,298 | 58.07% |

METHOD OF CREATING AN INDEX OF RESIDUAL VALUES FOR LEASED ASSETS, TRANSFERRING RESIDUAL VALUE RISK, AND CREATING LEASE SECURITIZATIONS

BACKGROUND OF THE INVENTION

1. Field of the Invention

The present invention relates to a method of creating an index of residual values for leased assets, transferring residual value risk, and creating lease securitizations and, in particular, to a method of creating an index of residual values for leased vehicles and of transferring residual value risk and creating lease securitizations such as futures, options and insurance products in consideration of the index of residual values.

2. Description of the Related Art

Residual Value Risk.

Auto leasing has become quite common in the last 15 years. In the United States, currently about 30% of all new cars are financed through leasing. In lease financing, the auto is technically the property of the finance company, even though the lessee is driving the vehicle and otherwise has rights and responsibilities very similar to owning that same car.

Unlike traditional financing, where the purchaser assumes the risk of fluctuations in used car prices, a lease makes the finance company the primary party exposed to changes in market value. Thus, banks, automakers' finance units, and other financial institutions have large risks relating to the market value of leased vehicles when they are returned at the ends of leases.

Although the resale value of a used car does not factor into traditional financing, it is very important in setting lease terms. For example, if a new year 2000 Toyota Camry has an initial cost of $20,000, Finance Company A might assume that its residual value would be $15,000 at the end of a three year lease. Finance Company B might assume that the same Camry would be worth $16,000 at the end of the same lease. Since Finance Company B assumes the vehicle will have a higher resale value, if the effective interest rates offered by both finance companies are the same, Company B will require a lower lease payment and obtain substantially more business than Company A.

Either finance company would have to wait until the end of the three-year lease to be sure of the final residual value and the exact profitability of that lease. If the actual residual value is $14,000, Company B will experience a residual value loss of $2,000. While $2,000 is immaterial for most finance companies, it is likely that similar overestimations of residual value were made on other vehicles of the same model. During times of intense competition, many finance companies have overestimated the residual values of large portions of the leases originated during an entire model year. In 1999, the Consumer Bankers Association estimated that banks lost money on about 75% of auto leases and that the average shortfall was $1,800 per car. Overestimates of residual value can cause unexpected losses of tens of millions of dollars for large finance companies. Many finance companies use residual value estimates from third parties, such as the Automobile Lease. Guide. However, these third party estimates are not guarantees and are subject to problems similar to any economic forecast.

If the actual residual value at the end of three years is over $16,000, Company B will not experience a loss on sale. However, because of the way most leases are structured, finance companies do not derive most of the benefit when residual values are higher than expected. The auto lessee usually has the option of purchasing the vehicle at the lease residual value when the lease ends. If the car is worth substantially more than the lease residual value, the lessee will likely buy the car at the lease residual value and keep it or resell it at the higher actual market value. Thus, finance companies bear considerable downside risk with respect to residual value, but obtain little benefit from residual values which are far above expected.

Accounting Problems

Leasing companies also have a second problem with leasing which does not occur with traditional financing. Payments on traditional financing are accounted for as receivables. However, on lease financing, the lessee has not contracted to pay the residual value at the end of the lease. The lessee can simply return the car to the finance company in good condition. For this reason, the estimated residual value of the lease is not accounted for as a receivable.

Most finance companies are borrowing the money required to create leases. The finance company is paying cash to the dealer for the entire price of the car, but only has a receivable for the lease payments. Depending on the model and length of the lease, the residual value might be 30–80% of the purchase price of the car. Unless something is done with the leases, a leasing company will accumulate a large amount of volatile residual values as assets and a large amount of liabilities related to the money the finance company borrowed to buy the vehicles which were leased.

Securitizing Lease Payments

Many prior attempts to reduce residual value risks involve moving the ownership of the automobiles to other entities. Many finance companies bundle together large portfolios of automobile leases and create new securities from them. The process is similar to the method which Fannie Mae uses to bundle together large numbers of home mortgages to create a mortgage-backed security. With automobile leases, the process is referred to as lease securitization. Securitizing leases allows the finance company to remove large numbers of leases from their books and use the proceeds to initiate new leases. However, the uncertainty of residual values for the leases involved can create accounting problems and problems with selling the lease-backed security.

A retitling problem is also associated with automobile lease securitization. Purchasers of a lease-backed security generally prefer a security which is insulated from potential bankruptcy of the issuer. If the finance company has not planned in advance, this will take considerable effort to create. Unlike most other assets, an automobile can only be transferred if the owner, in this case the leasing company, signs the back of the certificate of title and certifies the odometer reading. After this step the new owner (in this case, the owner of the lease-backed security) applies for a new certificate of title in its own name. This would normally need to be done for every auto which is to be included in a lease-backed security and, therefore, imposes a significant administrative burden on purchasers of such lease-backed securities.

A common method of insulating purchasers of lease-backed securities from issuer bankruptcy and reducing administration is the creation of a titling trust. Title for leased vehicles is placed with the titling trust from the time of sale. The securitization is then accomplished by selling "beneficial interests" in the titling trust. The finance company services all of the leases from the trust and receives a servicing fee. Such trusts are usually limited partnerships insulated from the finance company's potential bankruptcy, however, they have their own administrative burdens.

In lease securitization, Generally Accepted Accounting Principles ("GAAP") accounting treatment is quite different from income tax accounting. Under bankruptcy rules and for GAAP accounting purposes, a lease securitization is typically treated as a sale. With care, many of these same securitizations are not treated as sales for income tax purposes. This allows the finance company to take depreciation on the vehicles each year.

Residual Value Protection

If a finance company wishes to securitize a group of leases, the potential purchasers and rating agencies will be concerned about residual value risk. If the finance company overestimates residual value, the lease-backed security may not be able to pay off its full interest and principal obligations. Three conventional approaches to reducing the residual value risk for purchasers of lease-backed securities are discussed below. See also, Stuart M. Litwin, "Unlocking the Mysteries of Auto Lease Securitization", *Business Credit*, September 1996, p. 28–30, incorporated herein by reference.

1. Purchasing residual value insurance from insurance companies. Although purchasing residual value insurance may seem to be a fairly straightforward approach to reducing the residual value risk, it suffers from problems with both capacity and counterparty risk. With regard to capacity, a major problem with residual value insurance is that the total amount of residual values for leases is huge. Total residual values for auto leases in the U.S. exceed $150 billion. See, Ward's 1999 Automotive Yearbook, incorporated herein by reference. Overestimates of 10% or more on a portfolio of leases has happened to some lenders in recent years. If most leases were covered by residual value insurance, a significant downturn in the used car market could create insured losses larger than Hurricane Andrew and the Northridge Earthquake combined ($15.5 billion and $15.3 billion, respectively). Losses of this magnitude would cause substantial insolvencies in the insurance industry.

Residual value insurance policies have typically been sold by a few small specialty insurance companies and the risk is unusually concentrated. Because of the limited capacity of residual value insurers, finance companies have found it difficult to purchase very large amounts of pure residual value insurance. Thus, many finance companies avoid purchasing residual value insurance due to the counterparty risk of these insurance companies.

2. Residual value guarantees from the finance company issuing the lease-backed security. The finance company itself can provide a specific amount of residual value guarantee for a particular securitization. This approach can work for finance companies which already have good credit ratings. With residual value guarantees, however, the finance company retains large amounts of residual risk, and many of the factors affecting the risk are beyond the finance company's control. Securitizing in this manner provides new cash to the finance company, but no relief from residual value risk. In fact, repeating this process tends to increase residual value risk: the finance company gets fresh supplies of cash and creates new leases with new residual value risk. In at least one case, the residual value retained by the auto finance unit was separately turned into a bond. See, Adam Reinebach, "Toyota Sells Rare Residual Value Securitization", *Investment Dealers Digest*, Aug. 10, 1998, p. 5, incorporated herein by reference. This transaction has been compared to issuing a catastrophe bond. Securitizing residual values separately requires significant amounts of analysis and credibility. Such bonds would need to be issued regularly to be a primary source of relief for residual value risk and are impractical for many issuers.

3. A segregated reserve account. In this case, the finance company establishes a cash fund from the proceeds of the securitization to cover a certain amount of potential shortfall from the residual values. The finance company is only at risk of losing this cash fund; any losses larger than the cash fund are borne by the lease-backed security purchasers. In some cases, there are provisions which allow the cash fund to be increased under certain circumstances. In other cases, there is some residual value insurance which attaches after the cash fund is exhausted. The primary problem with this approach is satisfying rating agencies and potential bondholders that the cash fund is sufficient for a low risk bond and a correspondingly low interest rate. The analysis required for issuing bonds with this type of guarantee is very extensive.

Other Index Futures and Options

The vast majority of futures and options traded on organized exchanges are based on one of the following: stock price, bond price, metal price, energy price, agricultural commodity price, exchange rate, stock index value, or bond index value. In the vast majority of cases, the underlyer can be purchased in the open market. However, there are several exceptions on the futures markets.

Catastrophe futures and options are traded on the Chicago Board of Trade. These are based on indexes of insured catastrophe losses occurring in the United States. Catastrophe futures are based on a liability index, rather than the typical asset price for futures.

The Bankruptcy Index is now traded on the Chicago Mercantile Exchange. This contract is based on an index of the number of consumer bankruptcy filings. Bankruptcy Index futures and options are based on an index which correlates with a liability: bankruptcy and dollars of consumer credit bad debt.

Heating Degree Day contracts are also traded on the Chicago Mercantile Exchange for several cities. These contracts correlate with energy demand and energy prices. These have no underlying asset or liability.

Presently, there are no known exchange-traded futures based on baskets of manufactured goods. See, Commodity Futures Trading Commission, "Futures and Options Contracts Designated by the Commodity Futures Trading Commission as of Sep. 30, 1998", September 1998, http://www.cftc.gov/annualreport98/contractsdesig.htm. Also, there are no known bond issues which have detachable exchange-traded futures or options.

In view of the foregoing, there is clearly a need for a method of creating an index of residual values for leased vehicles and of transferring residual value risk and creating lease securitizations such as futures, options and insurance products in consideration of the index of residual values.

Accordingly, it is an object of the present invention to provide a method for transferring residual value risk in a manner which is efficient and minimizes counterparty risk using futures and options.

It is another object of the present invention to provide a method for calculating a Residual Value Index which is useful for creating and pricing such futures and options.

It is another object to reduce the risk of insurer insolvency.

It is another object to provide substantial additional capacity for transfer of residual value risk.

It is another object to allow the creation of new insurance products which are made possible by residual value futures and options.

It is another object provide a system and method for performing certain calculations in valuing such futures and options.

It is another object to provide residual value hedging mechanisms which do not require large up front outlays of cash.

It is another object to generalize the approach from residual value to futures and options traded on any reliable index of assets which depreciate over time created by an independent party.

It is another object to generalize the approach from residual value to futures and options traded on any reliable index of value of manufactured goods created by an independent party.

It is another object to generalize the approach from residual value to futures and options traded on any reliable index of value of durable goods created by an independent party.

SUMMARY OF THE INVENTION

An exemplary preferred method according to the present invention includes one or more of the following steps: calculating a residual value index for all automobiles and light trucks sold during a particular period of time; calculating various residual value subindexes; creating exchange-traded residual value futures; creating exchange-traded residual value options; creating over the counter residual value futures; creating over the counter residual value options; creating new residual value insurance products; and using such futures, options and insurance to create new types of lease securitizations.

According to an exemplary preferred method of the present invention, residual values futures and options are created in consideration of an independent residual value ("RV") index for actual prices of lease returns. This is the underlying index on which the futures are calculated. An exemplary preferred index takes a third party source of actual residual values for automobiles of a given model and model year and weights the distribution between models to match the initial percentages of those models sold during that model year.

The principles of the present invention can be employed for other indexes, such as aircraft residual value indexes, and for aircraft residual value futures, options and insurance.

The principles of the present invention can also be employed for futures, options and insurance on the value of durable goods, manufactured goods, or an asset which depreciates over time.

Additionally, the principles of the present invention can be employed to provide new bond issues and lease securitizations which make use of the aforementioned futures and options.

In accordance with another embodiment of the present invention, a method of transferring residual value risk associated with future market value of goods includes the step of: determining terms of a contract pertaining to a residual value risk associated with a future market value of goods in consideration of an index of residual value for two or more types of goods.

In accordance with another embodiment of the present invention, a method of transferring residual value risk using exchange traded futures or options includes the step of: creating a lease securitization where residual value risk is mitigated using exchange traded futures or options.

In accordance with another embodiment of the present invention, a method of transferring residual value risk using exchange traded futures or options includes the step of: making a payment on a lease securitization where residual value risk is mitigated using exchange traded futures or options.

In accordance with another embodiment of the present invention, a method of creating a residual value index includes the steps of: identifying a plurality of assets of different types to be included in a residual value index; determining an initial market valuation for the assets; determining a starting value for the residual value index in consideration of the initial market valuation; at a later time, determining a subsequent market valuation for the assets; and determining a subsequent value for the residual value index in consideration of the subsequent market valuation.

In accordance with another embodiment of the present invention, a method of generating a time series of indexes or subindexes includes the steps of: creating new indexes of value at regular time intervals; and applying weightings to two or more items in the indexes.

In accordance with another embodiment of the present invention, exchange traded futures or options include: an exchange traded futures or options contract including terms which are determined in consideration of at least one underlying index of value within a master index, the master index including two or more series of similar indexes of value and new indexes of values for the series which commence trading at future points in time.

In accordance with another embodiment of the present invention, a method of qualifying futures or options for trading on an exchange includes the step of: obtaining approval from a regulatory body or entity for trading futures or options contracts on an exchange, the futures or options contracts including terms which are determined in consideration of at least one underlying index of value within a master index, the master index including two or more series of similar indexes of value and new indexes of values for the series which commence trading at future points in time.

In accordance with another embodiment of the present invention, a method of transferring residual value risk includes the step of: entering into, purchasing or selling an exchange traded futures or options contract including terms which are determined in consideration of at least one underlying index of value within a master index, the master index including two or more series of similar indexes of value and new indexes of values for the series which commence trading at future points in time.

In accordance with another embodiment of the present invention, over the counter futures or options including: an over the counter futures or options contract including terms which are determined in consideration of at least one underlying index of value within a master index, the master index including two or more series of similar indexes of value and new indexes of values for the series which commence trading at future points in time.

In accordance with another embodiment of the present invention, a method of transferring residual value risk includes the step of: entering into, purchasing or selling an over the counter futures or options contract including terms which are determined in consideration of at least one underlying index of value within a master index, the master index including two or more series of similar indexes of value and new indexes of values for the series which commence trading at future points in time.

In accordance with another embodiment of the present invention, a method of issuing a bond with a detachable security includes the steps of: choosing one or more preexisting exchange traded securities in consideration of a riskiness of a bond to be issued; purchasing the exchange traded securities; and issuing one or more detachable contracts in conjunction with the bond, the detachable contracts being related to the exchange traded securities which were purchased.

A. Calculating the index. An exemplary preferred residual value index according to the resent invention is similar in some respects to an index of multiple stock values, such as the S&P 500 index, and is calculated as follows:

1. The assets which will be included in the index are agreed upon. For the S&P 500 index, these are the 500 publicly traded companies which will become part of the index. For the residual value index, these are the make, model, model year, etc. For the master U.S. residual value index, the index would include all cars and light trucks sold in the U.S. in a particular model year. Similar indexes can be created for other countries or groups of countries.
2. For each different model of car, the market value per unit from an agreed source is multiplied by the number of units sold. These calculations produce a market valuation for that model of automobile. This is similar to the S&P 500 index using a market value weighting for components of the S&P 500.
3. To calculate the starting value for each index, the market values as of the start date are added together for all models in the index. This number is used as a basis for future comparison. The initial number can have some physical significance, such as the average price per car, or can be indexed to an even starting number, such as 100.
4. At later points in time, the index is recalculated with new market values for each model. For the Residual Value Index, the new values are the wholesale prices of each model used car from the third party source. This is similar to recalculating the S&P 500 index with current closing prices of stocks included in the index.
5. Unlike the S&P 500 index, a new Residual Value Index ("RVI") is created for each model year. Thus, there will be a 2000 RVI, a 2001 RVI, a 2002 RVI, etc. Since each RVI tracks the current values of a particular cross section of cars from a particular model year, there will be a number of RVIs valued at the same date. Moreover, RVIs can be calculated for any past model year for which reliable data is available, e.g., a 1977 RVI calculated as of the year 2000.
6. Just as the S&P 500 index has technology, utility and agricultural components, the RVI index can have related indexes and subindexes. Examples include: pickup trucks, sedans, Ford automobiles, eight cylinder automobiles, blue cars, red cars, convertibles, luxury cars, cars with initial prices over $30,000, cars leased through Toyota Motor Credit, and cars sold in California. Since the master RV database includes all models and submodels which are sold in a particular time period, the creation and updating of subindexes (e.g., pickup truck index, Ford index) requires very little effort. All of the necessary data is already collected and present in the database.

B. Creation of Futures, Options and Insurance Products. Once an index or subindex is agreed upon and calculated, a variety of financial products using the index can be created. For example:

1. A standard contract can be developed for exchange-traded index futures based off of the RVI.
2. Options on these futures can also be developed.
3. Over the counter futures and options can also be developed.
4. A variety of hedging strategies can be developed by companies which currently retain residual value risk. This would include both finance companies and insurance companies who have residual value guarantee programs in place.
5. New choices are provided for leasing companies who desire to securitize groups of leases through bond issues or private placements.
6. Insurance products which relate to the residual value of leases held or originated by a particular company can be designed or modified to make use of the new indexes.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein:

FIG. 5 is an output showing exemplary steps in tabulating optional equipment in order to calculate a starting value for a residual value index according to an exemplary preferred method of the present invention;

FIG. 6 is an output showing exemplary steps in calculating a starting value for a residual value index according to an exemplary preferred method of the present invention;

FIG. 7 is an output showing exemplary steps in calculating a subsequent value for a residual value index according to an exemplary preferred method of the present invention.

DETAILED DESCRIPTION OF THE PREFERRED EMBODIMENTS

An exemplary preferred embodiment of the present invention is adapted to create an index of residual value for groups of automobiles and to create related futures, options, and insurance products.

Major Inputs and Outputs

Figure 1:
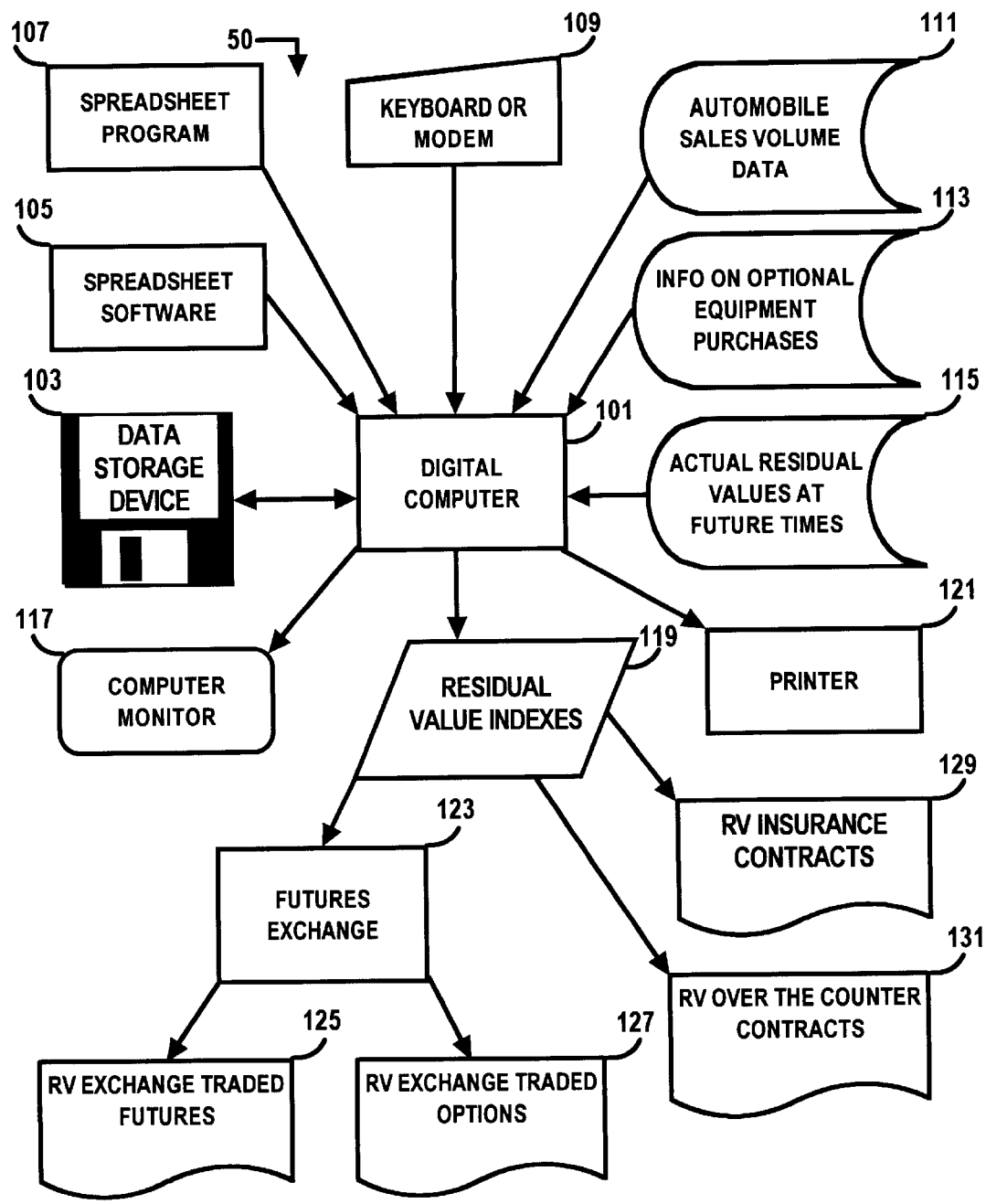
FIG. 1 is a high level, functional flowchart embodying of an exemplary preferred system and method according to the present invention.

Referring to FIG. 1, an exemplary preferred system 50 according to the present invention includes a digital computer 101, for example, a Microsoft Windows compatible personal computer using Windows 2000. The digital computer 101 has a keyboard or modem 109, data storage device 103 such as a hard drive, DVD drive, or floppy disk, a monitor 117, and printer 121. Other methods of inputting data can be substituted for the keyboard or modem 109, such as internet downloads, or reading from a floppy or DVD disk. Other methods of storing data can be substituted for the data storage device 103, such as a compact disk or magnetic tape. Other methods for outputting data can be substituted for the printer 121, such as a monitor, projector, plotter, or internet upload.

In a preferred embodiment, the digital computer 101 runs spreadsheet software 105, such as Lotus 123 Version 5.0 or Microsoft Excel 2000.

The system 50 also includes a computer executable program which in a preferred embodiment is a spreadsheet program 107 such as an Excel spreadsheet containing the software which manipulates the input data.

The digital computer 101 can use many different sets of input data, as shown in FIG. 1. These inputs include Automobile Sales Volume Data 111, Information on Optional Equipment Purchases 113, and Actual Residual Values at Future Times 115. It should be understood that Optional Equipment Purchases 113 are not required for calculations, but often makes such calculations more accurate. Similarly, a less accurate weighting could be substituted for Automobile Sales Volume Data 111, such as equally weighting all models in the index, regardless of their sales. Forecasts of the future value of the Residual Value Indexes 119 can be obtained by substituting forecasts of residual values for Actual Residual Values at Future Times 115.

The Residual Value Index 119 is a sales volume weighted index of actual residual values for all models sold in a particular model year. Alternatively, if automobile sales data for a period other than a model year, such as a calendar year, are substituted in Automobile Sales Volume Data 111, a residual value index for that time period can be calculated. Optionally, the Residual Value Index 119 has assorted subindexes composed of models which are components of the overall index.

The Residual Value Index 119 is used as underlying information from which a Futures Exchange 123 creates Residual Value Exchange Traded Futures 125 and/or Residual Value Exchange Traded Options 127. The Residual Value Index 119 can also be used to create Residual Value Over the Counter Contracts 131 or Residual Value Insurance Contracts 129.

Generally, Inputs 111–115 are processed by the spreadsheet program 107, using spreadsheet software 105, and digital computer 101. Output is sent to a Data Storage Device 103, a Monitor 117, or a printer 121. The system 50 is further adapted to print, display, or save, as desired, Residual Value Indexes 119.

Calculating the Starting Value for the RV Index

Figure 2:
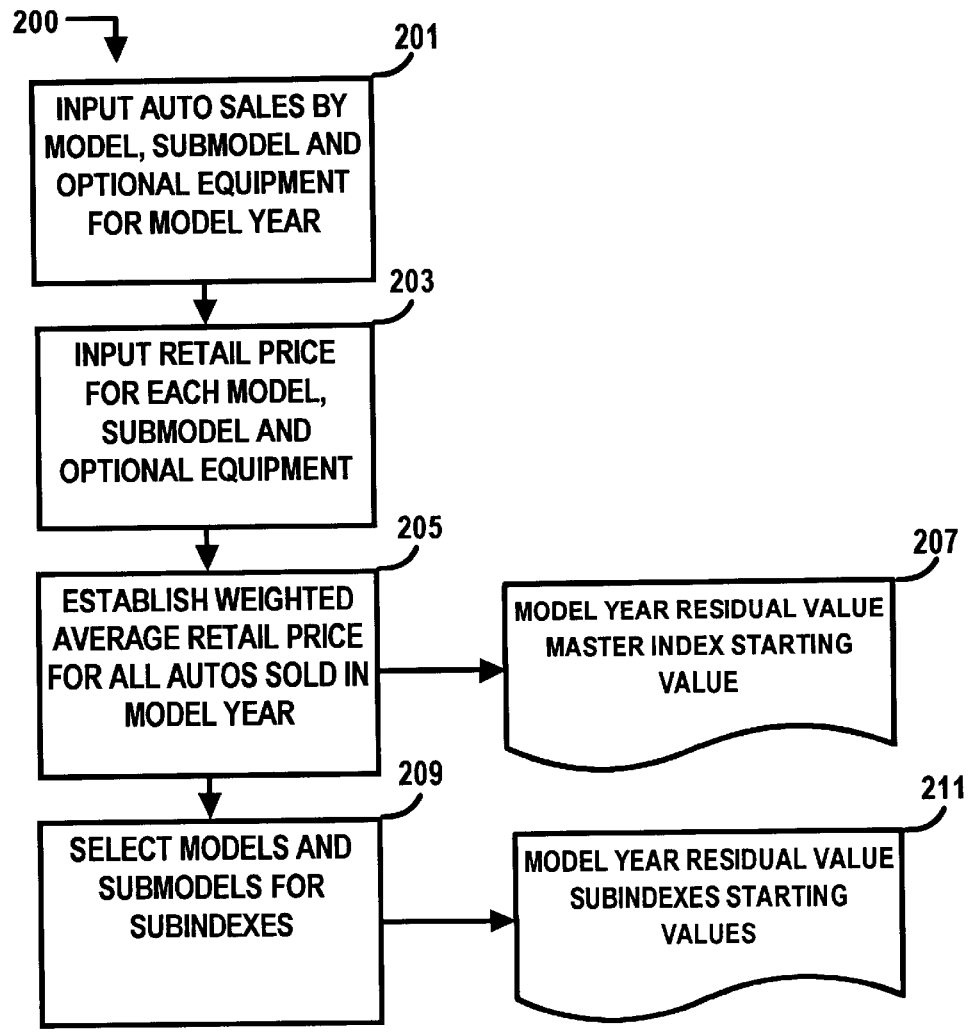
FIG. 2 is a flowchart showing steps involved in setting the initial values for the RV index and subindexes according to an exemplary preferred method of the present invention.

FIG. 2 illustrates steps of an exemplary preferred method 200 for calculating the starting values for a particular model year's Residual Value Index and subindexes.

At step 201, auto sales by model, submodel and optional equipment are input. In this exemplary preferred embodiment, the sales are for cars and light trucks in the United States for a particular model year. Other geographic areas, such as California, Canada, or the European Union can readily be substituted to provide a RV index for the matching geographic area. Data can be input using a keyboard, downloading via a modem or combining data from a storage devices such as a floppy disk.

According to an exemplary preferred embodiment, U.S. vehicles are segregated. The primary reasons for segregating U.S. vehicles are convenience and currency risk. If the index included vehicles sold in the U.S., Canada and Mexico, for example, there would be many finance companies which operate in one country but not the others. Since Canadian and Mexican vehicle prices would be converted from local currencies back to U.S. dollars for a multicountry index, a multicountry index would also have currency risk intermingled with residual value risk. Thus, separate indexes by country are used in the preferred embodiment.

As mentioned above with regard to input 113, including information on optional equipment purchases is not a requirement for calculation of the index, but often provides greater accuracy. Optional equipment usually depreciates at a faster rate than base model equipment. In the preferred embodiment, the Retail Prices For Each Model, Submodel, and Optional Equipment 203 include factory installed optional equipment in the same proportions as purchased by the public. Thus, if air conditioning is a $1000 option on a particular model and 60% of that model was sold with air conditioning, this is taken into account in the index.

Actual prices paid for individual automobiles can be substituted for Retail Prices 203, however, whether an individual purchaser received an unusually good or bad deal does not affect the residual value of the automobile when the lease expires years later. Thus, inputting actual prices paid usually adds significantly more work to the calculations without enhancing their usefulness.

For each model, submodel and optional equipment combination, sales are multiplied by price to Establish Weighted Average Retail Price for All Automobiles Sold In a Model Year 205. In the illustrated preferred embodiment, this is the weighted average of all cars and light trucks sold in the U.S. during a particular model year. In most years, the largest selling model in the U.S. is less than 3% of the total unit sales. Thus, the index is highly diversified.

The Weighted Average Retail Price for All Automobiles Sold In a Model Year 205 is used to calculate the Model Year Residual Value Master Index Starting Value 207, which can be expressed as a total value of all automobiles, an average value per auto, or an arbitrary starting value, such as 100. A sample calculation for Model Year Residual Value Master Index Starting Value 207 is displayed in FIGS. 5 and 6, which include column headings with calculation details.

From the data required to calculate the average retail price for all automobiles sold in a particular model year, the next step is to Select Models and Submodels for Subindexes 209 in order to calculate Model Year Residual Value Subindexes Starting Values 211. The method of calculation for the subindexes is similar to steps 205 and 207, but only includes a portion of all models. Many different subindexes can be defined, for example: pickup trucks, sedans, Ford automobiles, eight cylinder automobiles, blue cars, red cars, convertibles, luxury cars, cars with initial prices over $30,000, cars leased through Toyota Motor Credit, cars sold using traditional financing, or cars sold in California. Since an exemplary preferred master RV database includes all models and submodels which are sold in a particular time period, the creation and updating of subindexes (e.g., pickup truck index, Ford index) requires very little effort. All of the necessary price and model data is already collected and present in the database.

Calculation of Residual Value Indexes at Subsequent Points in Time

Figure 3:
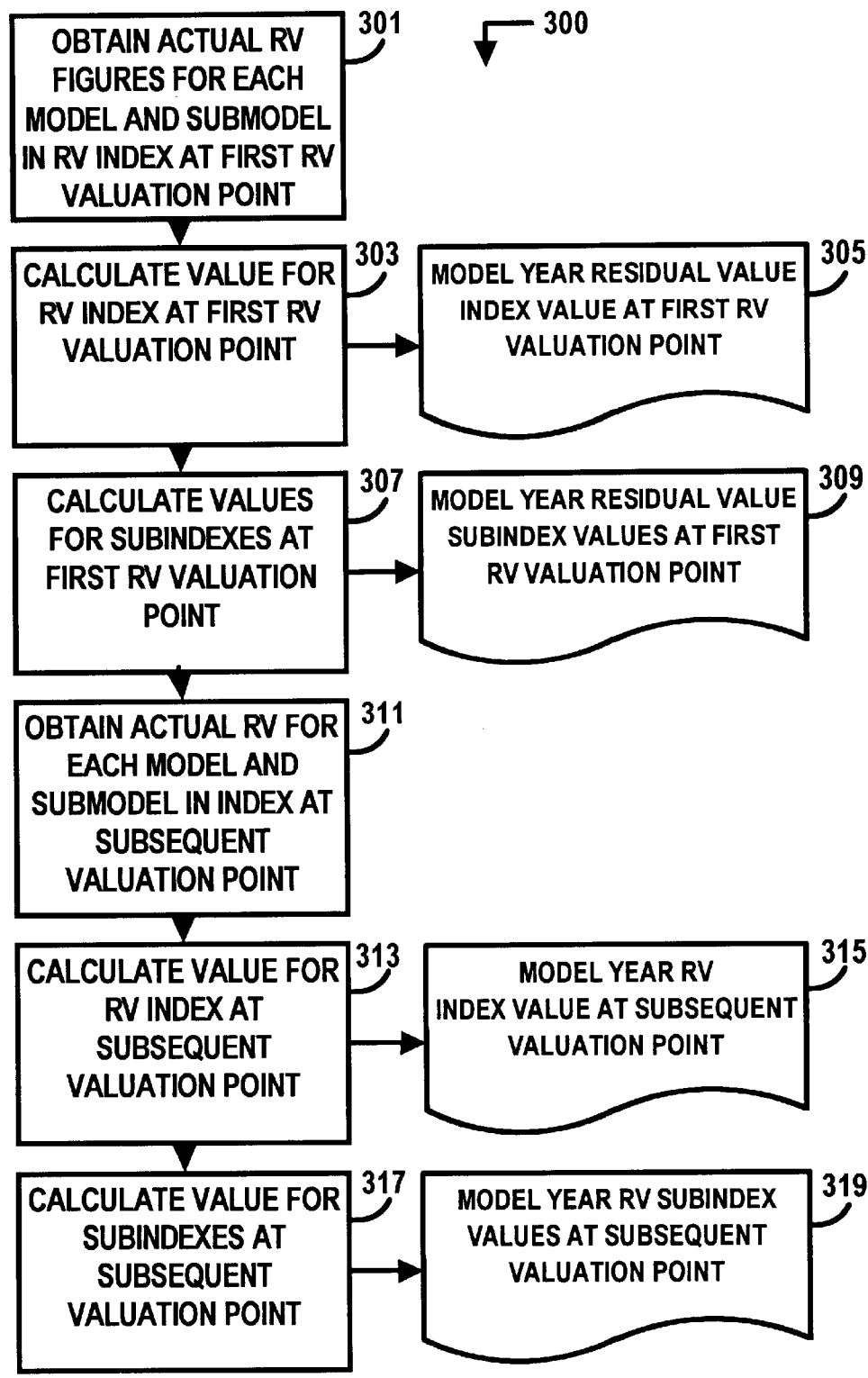
FIG. 3 is a flowchart showing steps involved in setting subsequent values for the RV index and subindexes according to an exemplary preferred method of the present invention.

FIG. 3 illustrates steps of an exemplary preferred method 300 for calculating the values for a particular model year's Residual Value Index and subindexes at subsequent points in time.

To calculate the value for the RV Index at the first RV valuation point in step 303, it is necessary to Obtain Actual RV Figures for Each Model and submodel in the RV index at the first RV valuation point in step 301. The actual RV figures from step 301 are multiplied by the same auto sales by model, submodel and optional equipment figures used in step 201. This produces the Model Year Residual Value Index at the first RV valuation point 305. There are no time restrictions on when the first valuation point occurs. It can be during the model year or after. Similarly to the Model Year Residual Value Master Index Starting Value 207, the Model Year Residual Value Index at the first RV valuation point 305 can be expressed as a total value of all automobiles, an average value per auto, or expressed relative to an arbitrary starting value, such as 100. Like most durable goods and manufactured goods, automobiles are typically assets which depreciate over time. Therefore, for the great majority of models at the majority of valuation points, the index will drop from the prior valuation. The overall index will likely drop from one valuation to the next.

In a manner similar to steps 209 and 211, Model Year Residual Value Subindexes valued at the first valuation point are calculated in steps 307 and 309 using residual values at the first valuation point.

The processes used in steps 301–309 are repeated as many times as desired for subsequent valuation points in steps 311–319. Since many leases are for a 60 month term, the calculations can be, but are not necessarily, repeated at least until a valuation date 66 months after the end of a particular model year. An exemplary series of calculations of the residual value index performed in Excel are shown in FIG. 7, which includes column headings with calculation details.

Creation of Exchange Traded Futures and Options

Figure 4:
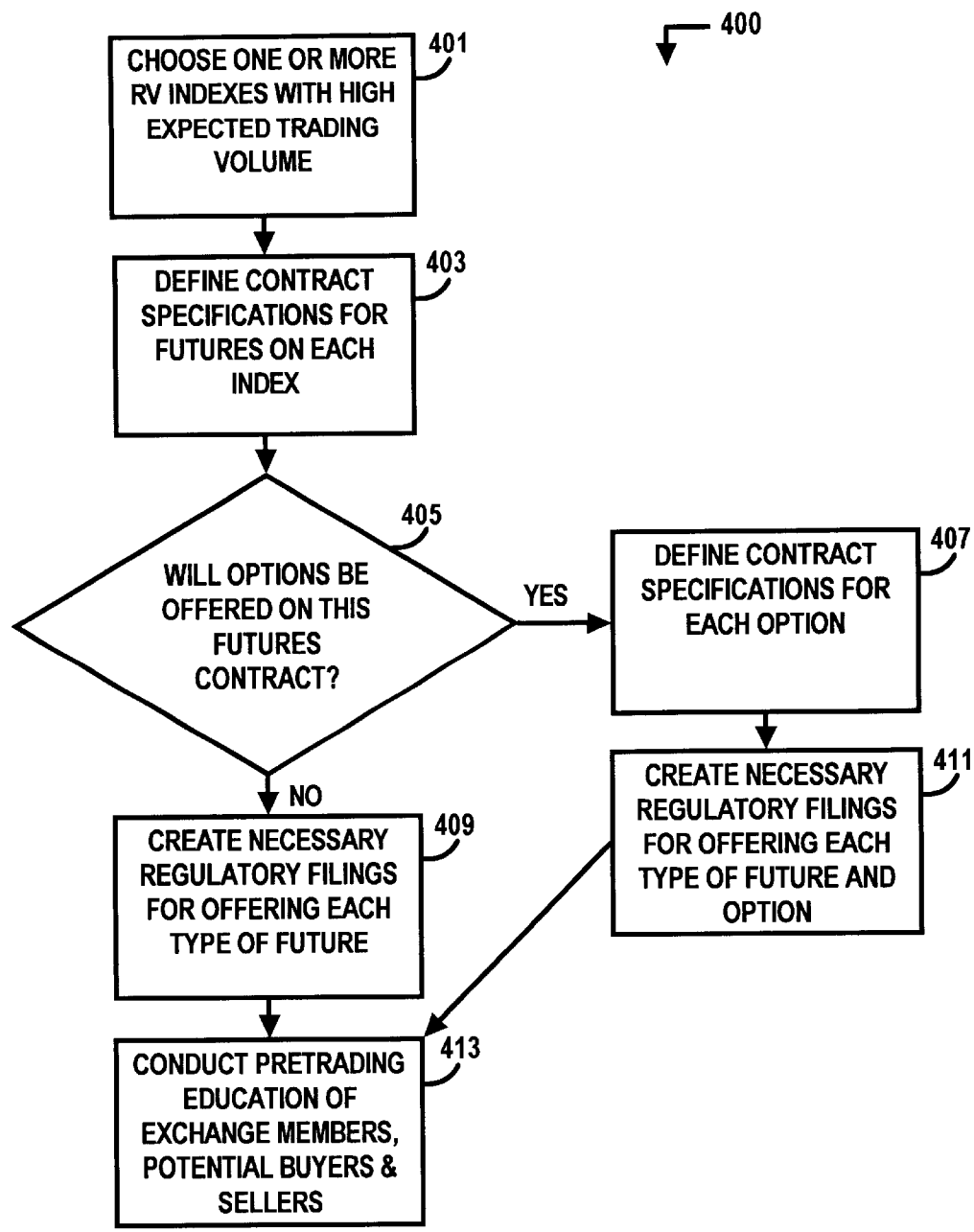
FIG. 4 is a flowchart showing steps involved in creating futures and options contracts based on the RV index or subindexes according to an exemplary preferred method of the present invention.

FIG. 4 illustrates steps of an exemplary preferred method 400 for using Residual Value indexes to create futures and/or options which are traded on an organized exchange.

Step 401 involves choosing one or more RV indexes or subindexes, for example, with high expected trading volume. For example, potential traders, hedgers, brokers and the exchange might decide to trade in futures on one index which includes all cars and light trucks sold in a particular model year. These same parties might also decide to trade in futures on an index which includes only light trucks, or only imported cars, for example. Contract specifications for each future are then determined in step 403.

The same parties then determine which contracts should also have exchange traded options in step 405. Put options can be an alternative to other methods of guaranteeing residual value. When it appears that options are desirable, contract specifications for each option are set in step 407.

One feature of RV index futures and options pertains to physical delivery. For most futures contracts, the exchange allows settlement with physical delivery. While most contracts for wheat or live hogs do not result in delivery, the contract allows it. In some cases, such as the S&P 500 index, delivery of stock certificates in the right proportions would be possible, but difficult. In other cases, such as heating degree days or the bankruptcy index, delivery of the underlying quantity is impossible. Given that delivery of fractional cars would be required for some models, and that the United States RV index could include more than 1,000 models and submodels, physical delivery will not likely be allowed under the contract terms.

Necessary regulatory filing for futures and options are created in steps 409 and 411, respectively. Concurrent to, or subsequent to, regulatory filings, marketing and education for exchange members, brokers, and potential buyers and sellers are preferably provided in step 413.

Creation of Over The Counter Futures and Options, Insurance Contracts

It is very likely that the creation of exchange traded futures and options will spawn similar over the counter ("OTC") securities. Thus, a general discussion of the development of OTC securities resembling exchange traded securities and the typical elements of OTC securities is presented below.

In an OTC futures contract, both parties have a counterparty risk, as the price can either rise or fall. In an OTC option contract, the option purchaser has a counterparty risk on the option seller. It should be noted that the purchase of an insurance contract with an admitted insurance carrier is similar to purchasing an OTC option; the insurance buyer has a counterparty risk on the insurance carrier. Most OTC contracts and insurance policies are settled at the end of the contract, rather than marked to market each trading day.

OTC contracts often mirror the exchange traded contract, but with a different strike price, delivery date, contract size, etc. One type of unusual OTC contract which can be used for RV options and futures is a contract based on a different distribution of models and submodels in the index. Thus, an OTC contract can be identical to the exchange-traded contract, except the distribution of models is for vehicles leased by Ford Motor Credit, for example.

A number of auto manufacturers have credit subsidiaries, called "captives", who do substantial amounts of leasing. Their lease portfolios are much more heavily weighted to a particular manufacturer's models than a bank or other finance company. This could create a basis risk, where the price changes of security used for hedging do not exactly offset the price changes of the assets being hedged. Techniques for minimizing basis risk using only traded securities include: changing the notional value of the hedge per hundred dollars of assets being hedged, combining multiple securities for the hedge (e.g., interest rate futures and RV futures, or oil price futures and RV index options), and delta hedging.

There are also strategies for minimizing basis risk which involve at least one security which is not traded on an exchange. If a manufacturer's captive finance unit wishes to minimize its basis risk, the captive can purchase an OTC contract which follows an RV subindex calculated for that captive's lease portfolio. The counterparty can retain the risk, or hedge part of this risk using a similar exchange-traded contract.

A very similar mechanism can be used by residual value insurers to hedge their residual value risk. Since residual value insurance policies usually run for several years, this mechanism can even be used for policies initiated before the exchange-traded product existed. The ability to hedge a portion of the residual value insurer's risk creates new insurance capacity. Insurance companies can also create basis risk insurance policies to cover the differential between the exchange-traded contract and the RV for a particular finance company.

Special Purpose Vehicles ("SPV") can use RV futures or options to hedge RV exposure and make securitizations easier. Using RV futures locks in the expected residual values for a bond issue. Thus, residual value guarantees, residual value insurance, and residual value segregated reserve accounts are either not needed or the need is greatly reduced. If the SPV owns the RV futures and actual residual values are above expected, the SPV or finance company will need to pay the difference. It is unlikely that RV futures would become part of the bond issue itself, since the bondholders would not want to have a new risk related to rises in residual value above expected levels.

RV put options allow a guarantee of a minimum level of residual value and can be combined with residual value guarantees, residual value insurance, and/or residual value segregated reserve accounts. RV put options can become part of the bond issue, and perhaps can become detachable from the bond issue. If the RV put option is detachable and separately tradable, bondholders can decide how much residual value risk they wish to keep. If a particular bond purchaser wishes to take the residual value risk, the purchaser can derive income from selling the RV put option in the open market. With the put option attached, the bond behaves like a highly secure bond issue. With the put option detached, the bond behaves more like a catastrophe bond, where certain parts of the interest or principal are at risk under specified conditions, such as large drops in residual value below expected levels. Nothing prevents a bondholder from repurchasing the same put option, or a different put option in the future.

Bonds have previously had an assortment of embedded options and a few types of detachable options. The most common detachable option is a warrant on the stock of the same company which issued the bond. In many cases, the warrants are separately filed with the U.S. Securities and Exchange Commission ("SEC"), have their own Committee on Uniform Security Identification Procedures ("CUSIP") number, and are traded on organized exchanges. Bonds which are convertible to the issuing company's stock have also been issued for years. On rare occasions, put or call options on the bond itself are detachable and tradable. To date, there have been no instances of detachable commodity options issued with bonds.

Figure 8:
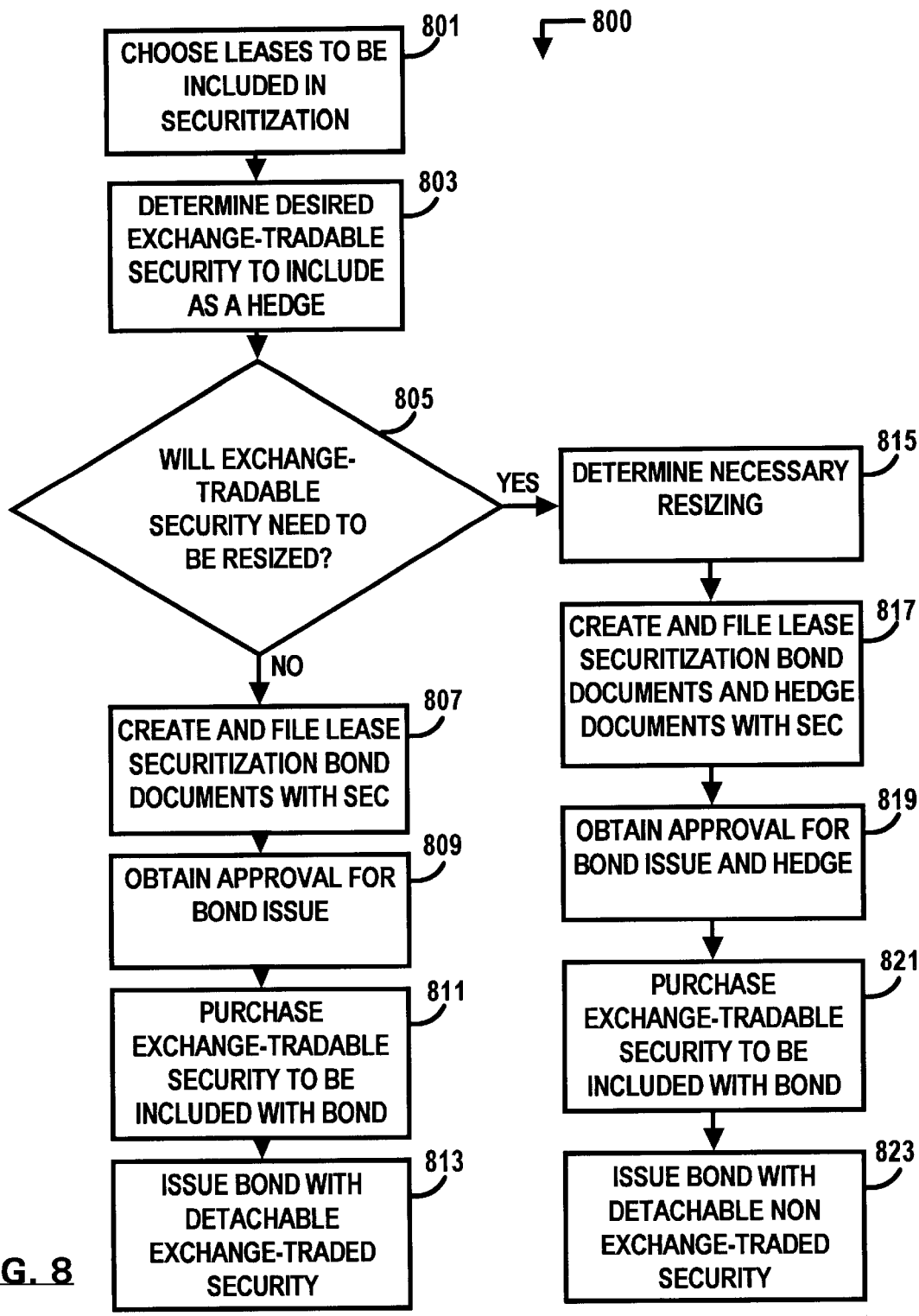
FIG. 8 is a flowchart showing steps involved in creating a bond issue with a detachable option according to an exemplary preferred method of the present invention.

Since exchange-traded residual value options presently do not exist, to date there have been no instances of detachable residual value options issued with bonds. According to the present invention, a method for creating such securities is similar in some respects to issuance of bonds with detachable warrants. An exemplary method 800 according to the present invention is illustrated in FIG. 8.

In step 801, the finance company determines which leases to include in a particular securitization. There are a large variety of ways of selecting leases. Leases can be selected for similar remaining term, a particular cross section of models, etc. For example, leases can be selected to closely match the profile of models included in an exchange-tradable future or option. In step 803, an exchange-tradable security which is expected to be a good hedge for the residual value risk of leases to be included in this securitization is selected.

Since most exchange-traded futures and options have large notional values (often in the hundreds of thousands), there may be a mismatch between the expected face value of the smallest increment of bond which the finance company would sell and the smallest increment of the hedge security. For example, the finance company might want to issue bonds in a minimum size of $1000 dollars, and multiples thereof. The desirable exchange-traded security might, for example, be an option with a minimum contract size which translates to a notional value of $200,000 on a particular date. If there is a mismatch, the finance company has at least two alternatives: increase the minimum size of the bond purchase so that one unit of the exchange-traded security is an appropriate hedge, or use the smaller bond sizes and create a new security which is a fractional share of the exchange-traded security. This decision is made in step 805. If the exchange-tradable security does not need to be resized, the finance company creates necessary filings for bond securitization documents in step 807 (similar to current lease securitization bond filings).

After SEC approval for the bond issue in step 809, the finance company proceeds in a manner similar to other lease securitizations; however, prior to the bond issuance, the finance company buys the exchange-traded securities in step 811. The bond is issued with the detachable security in step 813.

If it was determined that the exchange-tradable security needed to be resized in step 805, a new nonexchange-traded security can be created. The exact fraction of the exchange-traded security to match with the smallest unit of bond face value is determined in step 815. For example, it might be the case that a $1000 face value is the desirable minimum. The appropriate hedge for this bond value might be 2% of the minimum contract for the exchange-traded security. Thus, the issuer would need to create new securities which correspond to 2% of an exchange-traded security. These new securities would likely be issued by the SPV issuing the bonds, or a separate trust. The new securities are backed by the exchange-traded securities from which they are derived, similar to a mutual fund purchasing large blocks of securities and selling small shares in the mutual fund which are backed by the original securities. Separate SEC filings are created for the bond and the new hedge security in step 817.

After approval for both the bond and hedge are obtained in step 819, the finance company purchases the exchange-tradable security which will back the new hedge security in step 821. Then, the bonds are issued in step 823. Each bond issue has the appropriate amount of residual value hedge in the detachable nonexchange-traded security. The hedge security can be sold back to the trust or SPV at a price based on market price of the underlying exchange-traded security. If a sufficient number of the non-exchange securities are redeemed, whole exchange-traded securities can be sold back into the open market.

Additional Embodiment for Aircraft Lease Residual Value

With very little modification, the embodiment described above for automobile leases can be adapted for Residual Value Indexes for Aircraft. Aircraft leasing is common for commercial carriers and has similar residual value problems. If aircraft models are substituted for automobile models in the embodiment above, few other changes are necessary. Some distinctions which do occur are attributable to the international nature of the aircraft market, namely: worldwide production figures are preferably used for most indexes, and residual values are preferably denominated in a single currency. Once an index is determined, the steps for creation of futures, options, insurance, and bond issues are virtually identical to those for automobiles.

For many accounting uses, a financial institution need not buy any of the futures or options, but can use their prices to "mark to market" the expected residual value of a group of leased automobiles. The accuracy and potential bias of booked residual values has been a major point of dispute with auditors on many occasions, and has resulted in shareholder suits against corporations in some instances where actual RVs were considerably lower than booked RVs. The futures prices would provide unbiased third party estimates of future RVs and eliminate many of these disputes.

I claim:

1. A method of transferring residual value risk associated with future market value of automobiles, the method comprising the step of:

trading an exchange-traded contract pertaining to residual value risk associated with a future market value of two or more types of automobiles in consideration of an index of residual value for the two or more types of automobiles.

2. The method of transferring residual value risk associated with future market value of automobiles of claim 1, the method further comprising the step of:

calculating a value of the exchange-traded contract at one or more future points in time in consideration of a subsequent calculation of an index of residual value based upon subsequent market values of automobiles.

3. A method of transferring residual value risk associated with future market value of automobiles, the method comprising the steps of:

listing for trading an exchange-traded contract pertaining to residual value risk associated with a future market value of two or more types of automobiles in consideration of an index of residual value for the two or more types of automobiles;

calculating a value of the exchange-traded contract at one or more future points in time in consideration of a subsequent calculation of an index of residual value based upon subsequent market values of automobiles; and settling a trade in the exchange-traded contract in consideration of the subsequent calculation of an index of residual value.

4. A method of transferring residual value risk associated with future market value of automobiles, the method comprising the steps of:

determining terms of an exchange-traded contract pertaining to a residual value risk associated with a future market value of automobiles in consideration of an index of residual value for two or more types of automobiles;

obtaining market values of automobiles at one or more subsequent times;

calculating a value for a residual value index at the one or more subsequent times; and settling one or more trades in the exchange-traded contract in consideration of the one or more subsequent calculations of an index of residual value.

* * * * *